United States Patent
Marquès et al.

(10) Patent No.: US 10,800,301 B2
(45) Date of Patent: Oct. 13, 2020

(54) VEHICLE SEAT CUSHION WITH HEATER AND DETECTION MAT INTEGRATION

(71) Applicant: LEAR CORPORATION, Southfield, MI (US)

(72) Inventors: José Marquès, Vaux sus Seine (FR); Nathalie Navarro, Velizy (FR)

(73) Assignee: LEAR CORPORATION, Southfield, MI (US)

( * ) Notice: Subject to any disclaimer, the term of this patent is extended or adjusted under 35 U.S.C. 154(b) by 92 days.

(21) Appl. No.: 16/207,679

(22) Filed: Dec. 3, 2018

(65) Prior Publication Data
US 2020/0171988 A1 Jun. 4, 2020

(51) Int. Cl.
*B60N 2/56* (2006.01)
*B60N 2/58* (2006.01)
*B60N 2/64* (2006.01)

(52) U.S. Cl.
CPC ............. *B60N 2/5883* (2013.01); *B60N 2/56* (2013.01); *B60N 2/64* (2013.01); *Y10T 428/24033* (2015.01); *Y10T 428/24314* (2015.01)

(58) Field of Classification Search
CPC .... Y10T 428/24033; Y10T 428/24314; B60N 2/58; B60N 2/5883; B60N 2/56; B60N 2/5685; B60N 2/7035; B60N 2/7041
See application file for complete search history.

(56) References Cited

U.S. PATENT DOCUMENTS

| 5,016,941 A | 5/1991 | Yokota |
| 5,669,670 A | 9/1997 | Haraguchi et al. |
| 8,919,874 B2 | 12/2014 | Ota et al. |

FOREIGN PATENT DOCUMENTS

EP 2681074 A1 1/2014

*Primary Examiner* — Alexander S Thomas
(74) *Attorney, Agent, or Firm* — Brooks Kushman P.C.

(57) ABSTRACT

A method for making a vehicle seat cushion component includes a step of providing a viewable surface component having a first set of alignment features, the viewable surface component having a central section, a first flanking section and a second flanking section. A first side of a central foam panel is attached to the viewable surface component with a first flanking foam component separated from a central foam component to define a first gap and a second flanking foam component separated from the central foam component to define a second gap. A support foam panel is sewn to the central foam panel. The support foam panel includes a second set of attachment features and defines a plurality of slots that allow a removable component to be inserted between the central foam panel and the support foam panel after the components are sewn together.

20 Claims, 5 Drawing Sheets

VEHICLE SEAT CUSHION WITH HEATER AND DETECTION MAT INTEGRATION

TECHNICAL FIELD

In at least one aspect, the present invention is vehicle seat cushions, and in particular, to vehicle seat cushion have sewn decorative patterns.

BACKGROUND

Vehicles seats with decorative patterns are provided in U.S. Pat. Nos. 5,016,941; 5,669,670; and 8,919,874. Although the methods for forming such seat work reasonably well, improvements are nevertheless desired.

SUMMARY

In at least one aspect, the present invention provides a vehicle seat cushion component. The vehicle seat cushion component includes a viewable surface component having a central section, a first flanking section and a second flanking section. Th central foam panel is attached to the viewable surface component. The central foam panel includes a first flanking foam component, a second flanking foam component, and a central foam component. A support foam panel is attached to the central foam panel. The support foam panel defines a plurality of slots that allow a removable component to be inserted into spaces defined between the central foam panel and the support foam panel. Characteristically, the viewable surface component, the central foam component, and the support foam panel are secured together by a predetermined sew pattern that defines a plurality of central island sections and a plurality of side sections.

In at least one aspect, the present invention provides a method for making the vehicle seat cushion component set forth above. The method includes a step of attaching a central foam panel to a viewable surface component. The central foam panel has a first flanking foam component, a second flanking foam component, and a central foam component. A support foam panel is attached to the central foam panel. The support foam panel defines a plurality of slots that allow a removable component to be inserted between the central foam panel and the support foam panel. The method further includes a step of sewing a predetermined sew pattern that secures the viewable surface component, the central foam component, and the support foam panel together. Characteristically, the predetermined sew pattern defines a plurality of central island sections and a plurality of side sections.

In yet another aspect, the present invention provides a method for making the vehicle seat cushion component set forth above. Characteristically, the vehicles seat cushion component includes a plurality of central island sections and side sections sewn therein. The method includes a step of providing a viewable surface component having a first set of alignment features, the viewable surface component having a central section, a first flanking section and a second flanking section. A first side of a central foam panel is attached to the viewable surface component by adhering a first flanking foam component to the viewable surface component adjacent to the first flanking section, adhering a second flanking foam component to the viewable surface component adjacent to the second flanking section, and adhering a central foam component to the viewable surface component adjacent to the central section. The first flanking foam component is separated from the central foam component to define a first gap and the second flanking foam component is separated from the central foam component to define a second gap. A support foam panel is sewn to the central foam panel. The support foam panel includes a second set of attachment features and defines a plurality of slots that allow a removable component to be inserted between the central foam panel and the support foam panel. A predetermined sew pattern that secures the viewable surface component, the central foam component, and the support foam panel together is sewn to define the plurality of central island section and flanking sections. Advantageously, the first set of attachment features and the second set of attachment feature provide guide points for sewing the predetermined sew pattern.

In still another aspect, the present invention provides a method for making the vehicle seat cushion component set forth above. Characteristically, the vehicles seat cushion component includes a plurality of central island sections and side sections sewn therein. The method includes a step of providing a viewable surface component having first grouping of holes and a second grouping of holes defined by the viewable surface component. The first grouping of holes is positioned on opposite sides of an imaginary center line that divides the viewable surface component in halves. The viewable surface component has a central section, a first flanking section and a second flanking section. A first side of a central foam panel is attached to the viewable surface component by adhering a first flanking foam component to the viewable surface component adjacent to the first flanking section, adhering a second flanking foam component to the viewable surface component adjacent to the second flanking section, and adhering a central foam component to the viewable surface component adjacent to the central section. The first flanking foam component is separated from the central foam component to define a first gap and the second flanking foam component separated from the central foam component to defining a second gap. A support foam panel is attached to the central foam panel. The support foam panel has a third grouping of holes and a fourth grouping of holes where the third grouping of holes and the fourth grouping of holes are positioned on opposite sides of an imaginary center line that divides the support foam panel in halves. The third grouping of holes is aligned to the first grouping of holes and the fourth grouping of holes is aligned to the second grouping of holes. The support foam panel defines a plurality of slots that allow a removable component to be inserted between the central foam panel and the support foam panel. Finally, a predetermined sew pattern is sewn that secures the viewable surface component, the central foam component, and the support foam panel together. The predetermined sew pattern defines the plurality of central island section and flanking sections. Characteristically, the first grouping of holes is aligned to the third grouping of holes and the second grouping of holes is aligned to the fourth grouping of holes to provide guide points for sewing the predetermined sew pattern.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Figure 1:
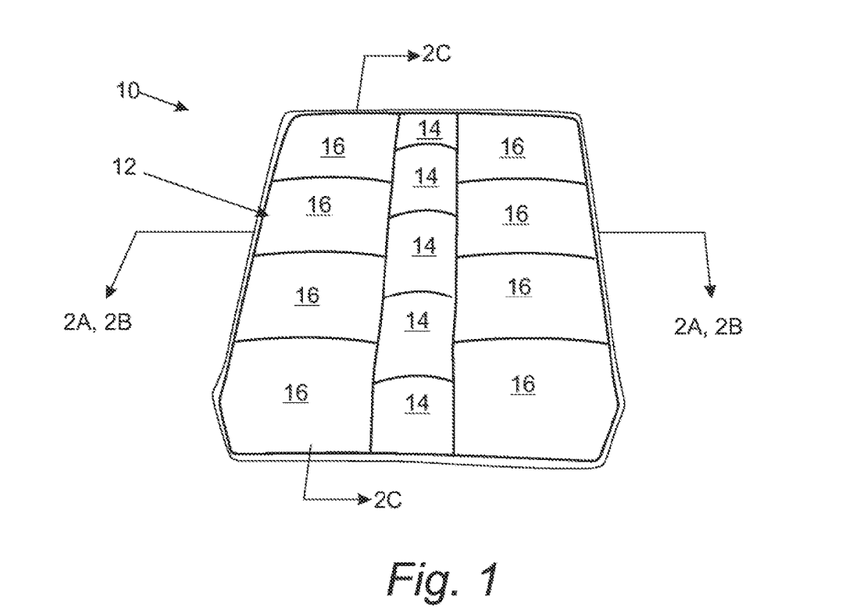
FIG. 1 is a perspective view of the top side of a vehicle seat cushion component. In this context, top side refers to the side design to be viewed.
Figure 2A:
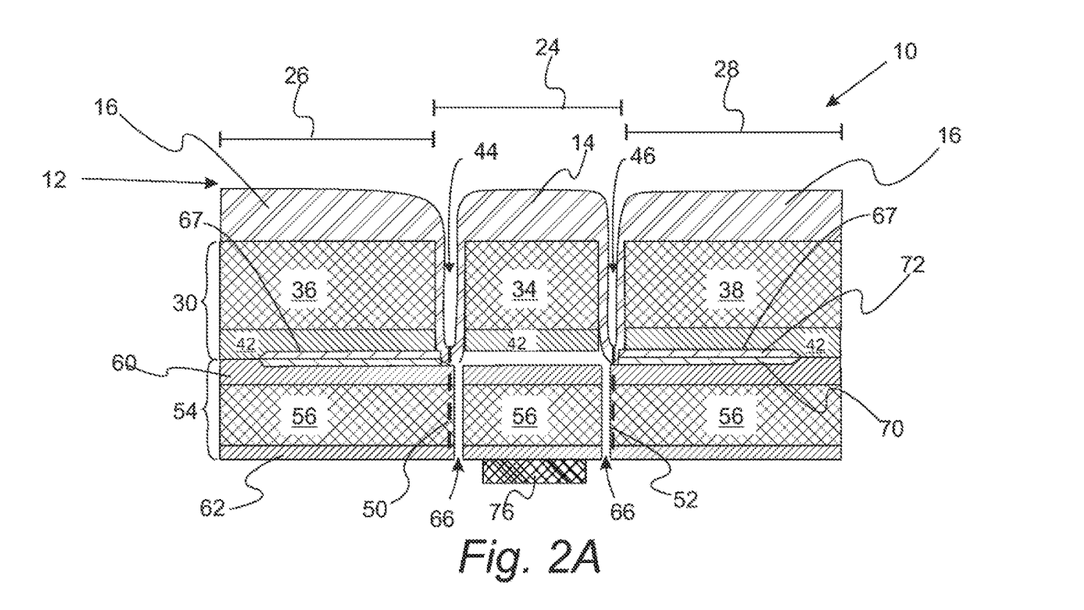
FIG. 2A is a schematic cross section of the cushion component after sewing.
Figure 2B:
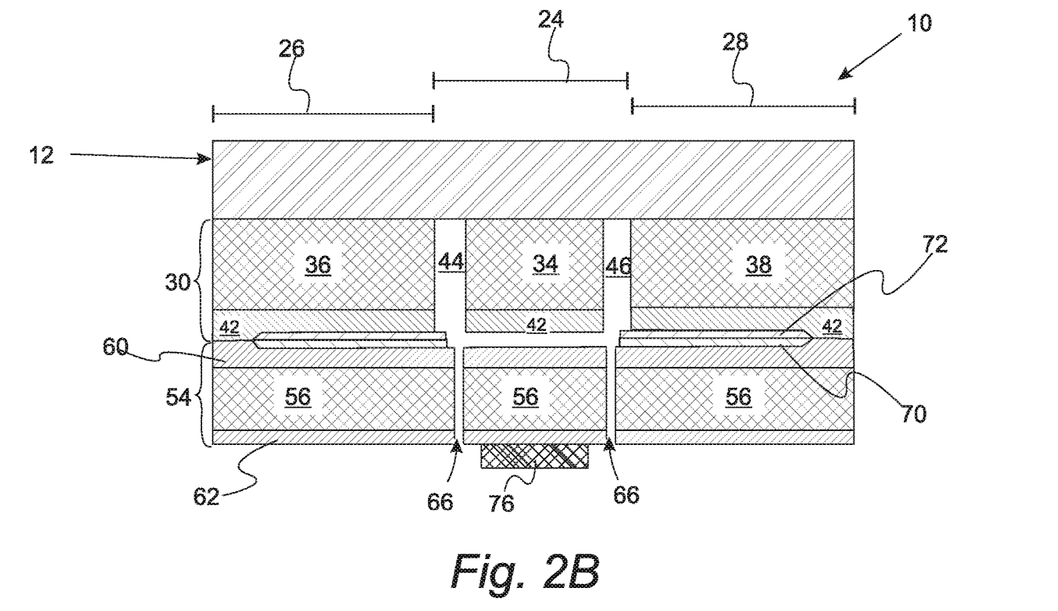
FIG. 2B is a schematic cross section of the cushion component before sewing.
Figure 2C:
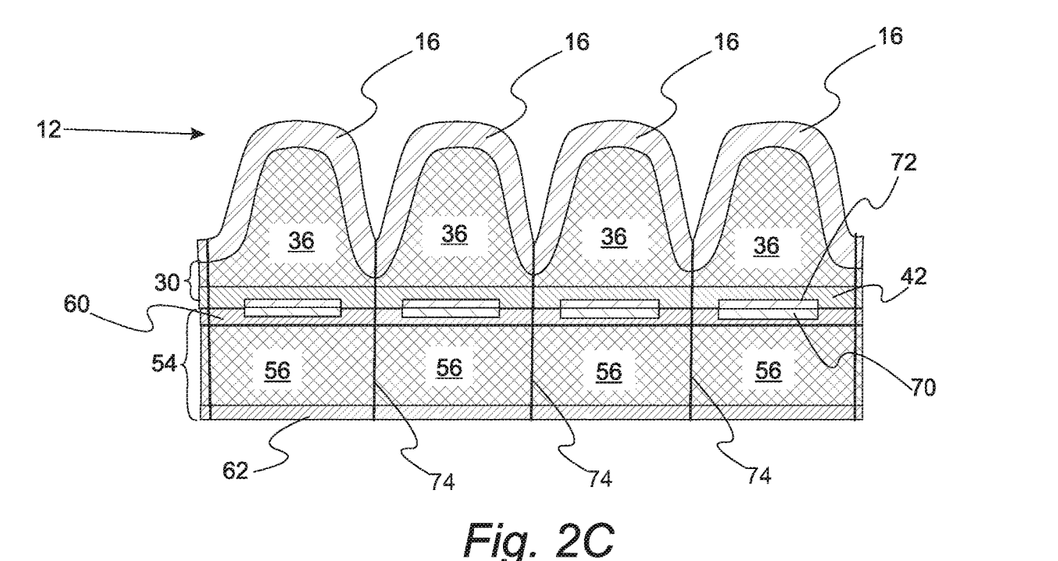
FIG. 2C is a schematic cross section perpendicular to the cross section of FIG. 2A of the cushion component after sewing.

With reference to FIGS. 1, 2A, 2B, and 2C, schematic illustrations of a vehicle seat cushion component are provided. FIG. 1 is a perspective view of the top side of a vehicle seat cushion component. In this context, top side refers to the side design to be viewed. FIG. 2A is a schematic cross section of the cushion component after sewing. FIG. 2B is a schematic cross section of the cushion component before sewing. FIG. 2C is a schematic cross section perpendicular to the cross section of FIG. 2A of the cushion component after sewing. Vehicle seat cushion set component 10 includes viewable surface component 12 which is sewn into a central pattern of island sections 14 and side sections 16. In a refinement, viewable surface component 12 is a fabric, leather, vinyl, or microfiber sheet (i.e., an A-surface sheet) that forms the A-surface of the vehicle seat cushion component. Viewable surface component 12 includes a first set of attachment features to assisting in guiding the sewing process. Viewable surface component 12 includes a central section 24, a first flanking section 26, and a second flanking section 28. Central foam panel 30 is attached to the viewable surface component viewable surface component 12. Central foam panel 30 includes central foam component 34 adhered to the viewable surface component 12 adjacent to the central section 24, a first flanking foam component 36 adhered to the viewable surface component adjacent 12 to the first flanking section 26, and second flanking foam component 38 adhered to the viewable surface component 12 adjacent to the second flanking section 38. In a refinement, each of central foam component 34, first flanking foam component 36, and second flanking foam component 38 include lining layer 42 on the side that is opposite to the side adhered to viewable surface component 38. Characteristically, first flanking foam component 36 is separated from the central foam component to define first gap 44 and the second flanking foam component 38 is separated from the central foam component to defines second gap 46. Gaps 44 and 46 provide recess locations for sew lines such as sew lines 50 and 52.

Still referring to FIGS. 1, 2A, 2B, and 2C, support foam panel 54 is attached to the central foam panel 30. Support foam panel 54 includes foam component 56 with optional lining layers 60, 62 on opposite sides. Support foam panel 54 define a plurality of slots 66 that allow a removable component to be inserted in spaces 67 defined between the central foam panel and the support foam panel. Examples of removable components include heater mat 70 and detection mat 72 Characteristically, a predetermined sew pattern is sewn that secures the viewable surface component 12, the central foam panel 30, and support foam panel 54 together. Side sections 16 are formed by sew lines 50, 52, and 74. In a refinement, attachment strip 76 (e.g., a loop layer) is attached to the bottom (side designed not to be view) of vehicle seat cushion component 10.

Figure 3:
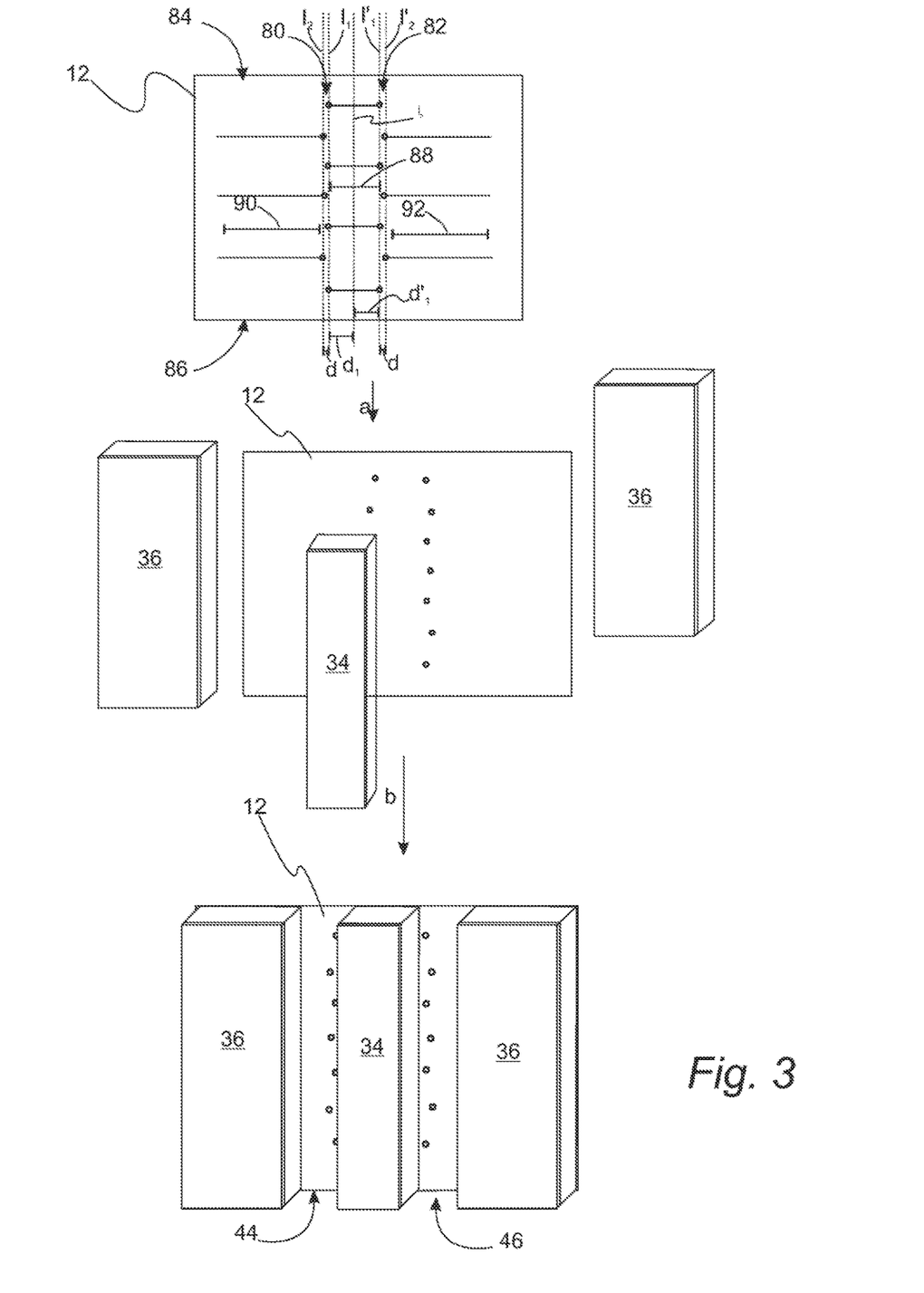
FIG. 3 is a schematic flow chart showing the attachment of a central foam panel to viewable surface component.
Figure 4:
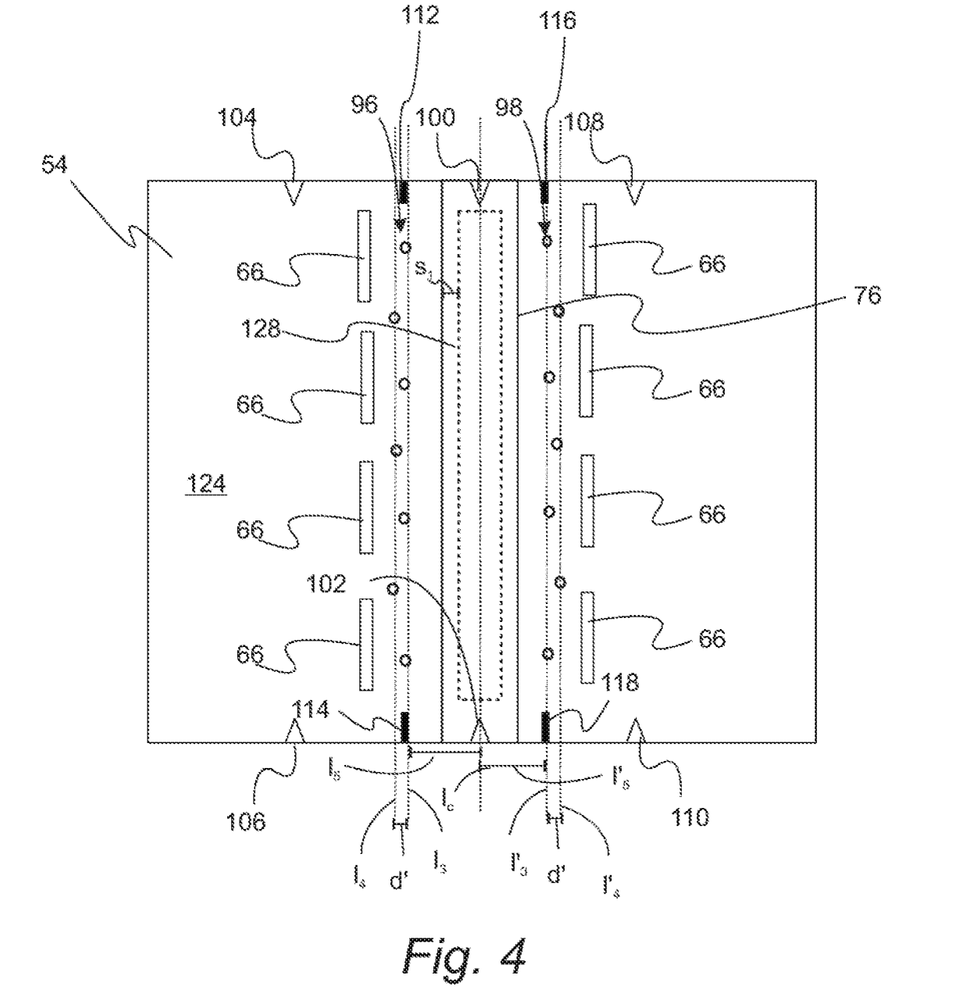
FIG. 4 is a bottom view of a support foam panel that is attached to the central foam panel.
Figure 5:
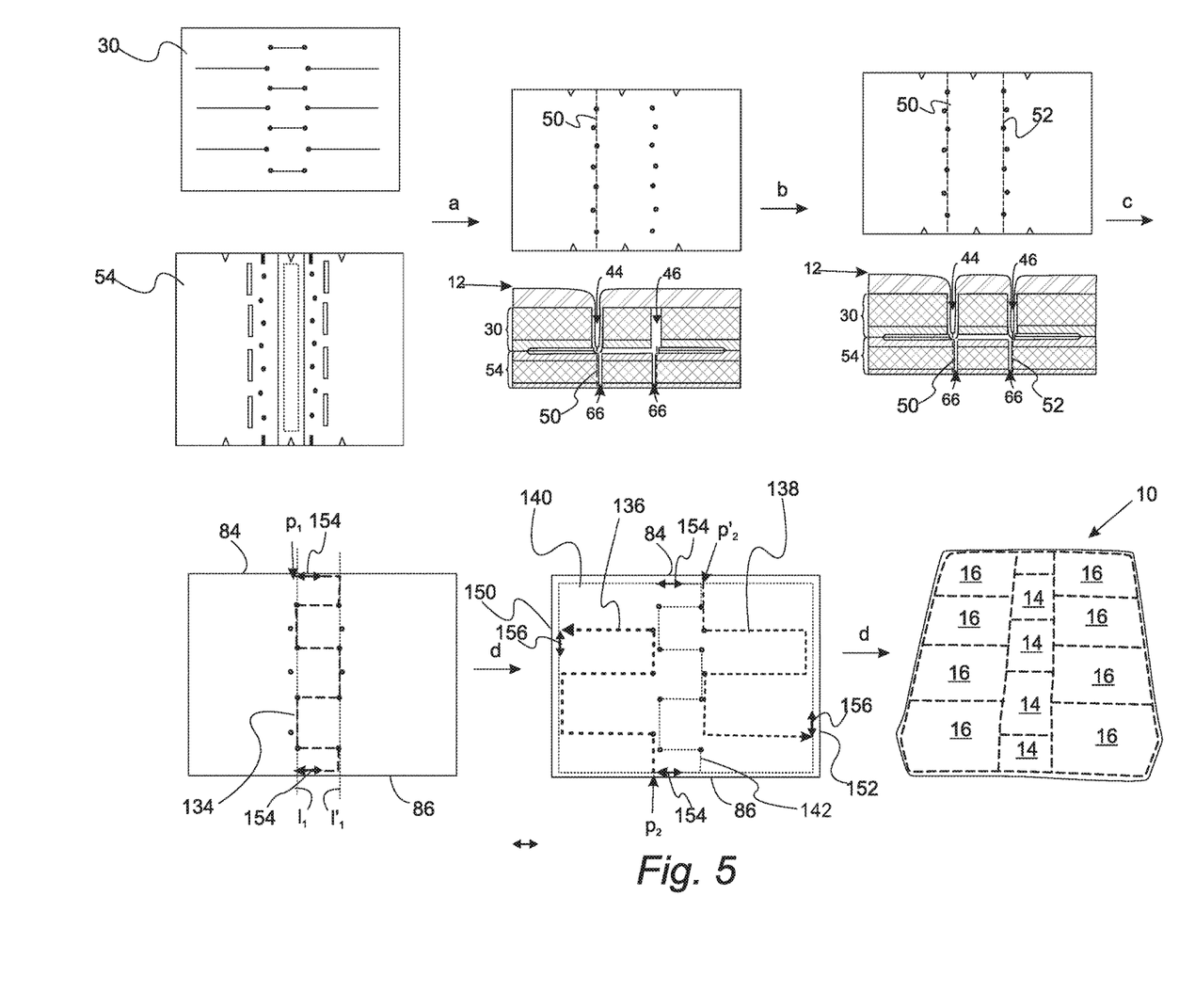
FIG. 5 is a schematic flowchart showing the attachment of a support foam panel to the combination of the viewable surface component and the central foam panel.

With reference to FIGS. 3, 4, and 5 a method for forming the vehicle seat component of FIGS. 1, 2A, 2B, and 2C is schematically illustrated. FIG. 3 is a schematic flow chart showing the attachment of central foam panel 30 to viewable surface component 12. In a variation, the first set of alignment features includes first grouping of holes 80 and second grouping of holes 82 each defined by viewable surface component 12. Characteristically, the first grouping of holes and the second grouping of holes are positioned on opposite sides of an imaginary center line that divides the viewable surface component in halves. Grouping of holes 80 includes a first plurality of linearly aligned holes aligned along imaginary line $1_1$ and a second plurality of linearly aligned holes aligned along imaginary line $1_2$. Similarly, grouping of holes 82 includes a third plurality of linearly aligned holes aligned along imaginary line $1'_1$ and a fourth plurality of linearly aligned holes aligned along imaginary line $1'_2$. The first plurality of linearly aligned holes aligned along imaginary line $1_1$ and the third plurality of linearly aligned holes aligned along imaginary line $1'_1$ are offset from imaginary center line $1_c$ by distanced $d_1$ and $d'_1$, respectively. Typically, lines $1_1$, $1'_1$, $1_2$, $1'_2$, and $1_c$ are parallel and extend from first side 84 and second edge 86 of viewable surface component 12. As illustrated in steps a) and b), Central foam panel 30 is glued to viewable surface component 12 at a central portion 88 of viewable surface component 12. First flanking foam component 36 is similarly glued to viewable surface component 12 at a first side portion 90 of viewable surface component 12 while second flanking foam component 38 is similarly glued to viewable surface component 12 at a first side portio2 of viewable surface component 12. First flanking foam component 36 and second flanking foam component 38 are offset from central foam panel 30 to define gaps 44 and 46 such that two groupings of holes 80 and 82 are positioned between gaps 44 and 46, respectively.

After central foam panel 30 is attached to viewable surface component 12, bottom foam support panel 54 is aligned to this combination. The components are then sewn as set for below in more detail. FIG. 4 is a bottom view of support foam panel 54. The bottom of support foam panel 54 forms the bottom of seat cushion component 10. In a variation, second first set of alignment features includes third grouping of holes 96 and fourth grouping of holes 98 each defined by bottom foam support panel 54. Characteristically, the third grouping of holes and the fourth grouping of holes are positioned on opposite sides of an imaginary center line that divides the bottom foam support panel 54 in halves. Slots 66 and groupings of holes 96 and 98 are formed in (e.g., cut into) support foam panel 54 prior to assembly into seat cushion component 10. Groupings of holes 96 and 98 are typically arranged like groupings of holes 80 and 82. Groupings of holes 96 and 98 are arranged on opposite sides of centerline $1_c$. Therefore, grouping of holes 96 includes a fifth plurality of linearly aligned holes aligned along imaginary line $1_3$ and a sixth plurality of linearly aligned holes aligned along imaginary line $1_4$. Similarly, grouping of holes 98 includes a seventh plurality of linearly aligned holes aligned along imaginary line $1'_3$ and an eighth plurality of linearly aligned holes aligned along imaginary line $1'_4$. The fifth plurality of linearly aligned holes aligned along imaginary line $1_3$ and the seventh plurality of linearly aligned holes aligned along imaginary line $1'_3$ are offset from imaginary center line $1_c$ by distanced $d_5$ and $d'_5$, respectively. Lines 13 is separated from $1'_3$ by a distance d'. Similarly, $1_4$ is separated from $1'_4$ by a distance d'. Typically, lines $1_3$, $1'_3$, $1_4$, $1'_4$ and $1_c$ are parallel and extend from first side 84 and second edge 86 of viewable surface component 12. Therefore, the sixth plurality of linearly aligned holes aligned along imaginary line $1_4$ and the eighth plurality of linearly aligned holes aligned along imaginary line $1'_4$ are each separated from $1_c$ on opposite sides by distanced $d_5+d$ and $d'_5+d$, respectively. In a refinement, foam panel 54 includes alignment notches 100-110 and slits 112-118. Attachment strip 76 is attached to bottom side 124 of support foam panel 54. Typically, attachment strip 76 is shown to support foam panel 54 view sewn line 128 having multiple stitches. Selvage s1 with respect to the sewing of attachment strip to support foam panel 54 is typically from 1 to 10 mm (typically about 5 mm).

FIG. 5 provides a schematic flowchart showing the attachment of support foam panel 54 to the combination of viewable surface component 12 and central foam panel 30. In step a), first sew line 50 is formed through support foam panel 54 to the combination of viewable surface component 12 and central foam panel 30. In step b), second sew line 52 is formed through support foam panel 54 to the combination of viewable surface component 12 and central foam panel 30. In a refinement, first sew line 50 and second sew line 52 are aligned to imaginary lines $1_1$ and $1_2$, respectively. In step c), a pattern that at least partially defines island sections 14 is sewn into the combination of viewable surface component 12 and central foam panel 30 aligned to support foam panel 54. In this regard, sew line 134 is formed that holds these components together. In a refinement, the first plurality of linearly aligned holes aligned along imaginary line $1_1$ and the third plurality of linearly aligned holes aligned along imaginary line $1'_1$ are used as guide point for sewing line 134. In particular, at least a portion of sew line 134 is sewn as a zig zag pattern, an in particular, as a rectangular zig zag pattern with first plurality of linearly aligned holes aligned along imaginary line $1_1$ and the third plurality of linearly aligned holes aligned along imaginary line $1'_1$ acting as guide point as which the direction of sewing changes. It should be appreciated that fifth plurality of linearly aligned holes aligned along imaginary line $1_3$ are aligned with first plurality of linearly aligned holes aligned along imaginary line $1_1$ and a seventh plurality of linearly aligned holes aligned along imaginary line $1'_3$ is aligned with third plurality of linearly aligned holes aligned along imaginary line $1'_1$ acting as guide point as which the direction of sewing changes. It should be appreciated that fifth plurality of linearly aligned holes aligned along imaginary line $1_3$ is aligned with first plurality of linearly aligned holes aligned along imaginary line $1_1$. Similarly, a seventh plurality of linearly aligned holes aligned along imaginary line $1'_3$ is aligned with first plurality of linearly aligned holes aligned along imaginary line $1'_1$. In a refinement, seal line 134 starts a position proximate to the edge of viewable surface component 12

Still referring to FIG. 5, a pattern that at least partially defines island sections 16 is sewn into the combination of viewable surface component 12 and central foam panel 30 aligned to support foam panel 54 in step d). In this regard, sew lines 140 and 142 are formed that also hold these components together. In a refinement, the second plurality of linearly aligned holes aligned along imaginary line $1_2$ and the fourth plurality of linearly aligned holes aligned along imaginary line $1'_2$ are used as guide point for sewing lines 140 and 142. In particular, at least a portion of sew line 140 is sewn as a zig zag pattern, an in particular, as a rectangular zig zag pattern with second plurality of linearly aligned holes aligned along imaginary line $1_2$ and edge 150 providing guide points. Similarly, at least a portion of sew line 142 is sewn as a zig zag pattern, an in particular, as a rectangular zig zag pattern with second plurality of linearly aligned holes aligned along imaginary line $1'_2$ and edge 152 acting as guide point as which the direction of sewing changes. It should be appreciated that sixth plurality of linearly aligned holes aligned along imaginary line $1_4$ are aligned with second plurality of linearly aligned holes aligned along imaginary line $1_2$ and eighth plurality of linearly aligned holes aligned along imaginary line $1'_4$ is aligned with fourth plurality of linearly aligned holes aligned along imaginary line $1'_2$. In a refinement, seal line 140 starts a position $p_2$ proximate to the edge 86 of viewable surface component 12 and seal line 142 starts a position $p'_2$ proximate to the edge 86 of viewable surface component 12. Also depicted in FIG. 5 are back tacks 154 and 156 which are used at each beginning and end of the decorative sewing in the selvage area to reinforce sewing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat cushion component comprising:
   a viewable surface component having a central section, a first flanking section and a second flanking section;
   a central foam panel attached to the viewable surface component, the central foam panel having a first flanking foam component, a second flanking foam component, and a central foam component; and
   a support foam panel attached to the central foam panel, the support foam panel defining a plurality of slots that allow a removable component to be inserted into spaces between the central foam panel and the support foam panel, wherein the viewable surface component, the central foam component, and the support foam panel are secured together by a predetermined sew pattern that defines a plurality of central island sections and a plurality of side sections.

2. The vehicle seat cushion component of claim 1 wherein the first flanking foam component is separated from the central foam component to defining a first gap and the second flanking foam component is separated from the central foam component to defining a second gap, wherein at least a portion of the predetermined sew pattern has stitches positioned in the first gap and the second gap.

3. The vehicle seat cushion component of claim 1 further comprising an attachment strip attached to the support foam panel.

4. The vehicle seat cushion component of claim 1 wherein the central foam panel includes lining layers on one or both of opposite sides.

5. The vehicle seat cushion component of claim 1 wherein the removable component is a heater mat or a detection mat.

6. The vehicle seat cushion component of claim 1 wherein the viewable surface component has a first set of alignment features and the support foam panel has a second set of alignment features, the first set of alignment features and the second set of alignment features providing guide points for sewing the predetermined sew pattern.

7. The vehicle seat cushion component of claim 6 wherein the first set of alignment features including a first grouping of holes and a second grouping of holes defined by the viewable surface component, the first grouping of holes being positioned on opposite sides of an imaginary center line that divides the viewable surface component in halves and wherein the second set of alignment features includes a third grouping of holes and a fourth grouping of holes, the third grouping of holes and the fourth grouping of holes being positioned on opposite sides of an imaginary center line that divides the support foam panel in halves, the third grouping of holes being aligned to the first grouping of holes and the fourth grouping of holes being aligned to the second grouping of holes.

8. The vehicle seat cushion component of claim 7 wherein the first grouping of holes includes a first plurality of linearly aligned holes and second plurality of linearly aligned holes, the first plurality of linearly aligned holes being closer to the imaginary center line than the second plurality of linearly aligned holes, and wherein the second grouping of holes includes a third plurality of linearly aligned holes and fourth plurality of linearly aligned holes.

9. The vehicle seat cushion component of claim 8 wherein the third grouping of holes includes a fifth plurality of linearly aligned holes and sixth plurality of linearly aligned holes and wherein the fourth grouping of holes includes a seventh plurality of linearly aligned holes and eighth plurality of linearly aligned holes.

10. The vehicle seat cushion component of claim 9 wherein a first rectangular zig zag pattern is sewn using the first plurality of linearly aligned holes and the third plurality of linearly aligned holes to at least partial define the central island sections; a second rectangular zig zag pattern is sewn using the second plurality of linearly aligned holes to at least partial define the side sections; and a third rectangular zig zag pattern is sewn using the fourth plurality of linearly aligned holes to at least partial define the side sections.

11. A method for making a vehicle seat cushion component comprising:
    attaching a central foam panel to a viewable surface component, the central foam panel having a first flanking foam component, a second flanking foam component, and a central foam component;
    attaching a support foam panel to the central foam panel, the support foam panel defining a plurality of slots that allow a removable component to be inserted between the central foam panel and the support foam panel; and
    sewing a predetermined sew pattern that secures the viewable surface component, the central foam component, and the support foam panel together, the predetermined sew pattern defining a plurality of central island sections and a plurality of side sections.

12. The method of claim 11 wherein the first flanking foam component is separated from the central foam component to defining a first gap and the second flanking foam component is separated from the central foam component to defining a second gap such that a portion of the predetermined sew pattern passes between the first gap and the second gap.

13. The method of claim 11 further comprising an attachment strip attached to the support foam panel.

14. The method of claim 11 wherein the central foam panel includes lining layers on one or both of opposite sides.

15. The method of claim 11 wherein the removable component is a heater mat or a detection mat.

16. The method of claim 11 wherein the viewable surface component has a first set of alignment features and the support foam panel has a second set of alignment features, the first set of alignment features and the second set of alignment features providing guide points for sewing the predetermined sew pattern.

17. The method claim 16 wherein the first set of alignment features including a first grouping of holes and a second grouping of holes defined by the viewable surface component, the first grouping of holes being positioned on opposite sides of an imaginary center line that divides the viewable surface component in halves and wherein the second set of alignment features includes a third grouping of holes and a fourth grouping of holes, the third grouping of holes and the fourth grouping of holes being positioned on opposite sides of an imaginary center line that divides the support foam panel in halves, the third grouping of holes being aligned to the first grouping of holes and the fourth grouping of holes being aligned to the second grouping of holes.

18. The method of claim 17 wherein the first grouping of holes includes a first plurality of linearly aligned holes and second plurality of linearly aligned holes, the first plurality of linearly aligned holes being closer to the imaginary center line than the second plurality of linearly aligned holes, and wherein the second grouping of holes includes a third plurality of linearly aligned holes and fourth plurality of linearly aligned holes.

19. The method of claim 18 wherein the third grouping of holes includes a fifth plurality of linearly aligned holes and sixth plurality of linearly aligned holes and wherein the fourth grouping of holes includes a seventh plurality of linearly aligned holes and eighth plurality of linearly aligned holes.

20. The method of claim 19 wherein a first rectangular zig zag pattern is sewn using the first plurality of linearly aligned holes and the third plurality of linearly aligned holes to at least partial define the central island sections; a second rectangular zig zag pattern is sewn using the second plurality of linearly aligned holes to at least partial define the side sections; and a third rectangular zig zag pattern is sewn using the fourth plurality of linearly aligned holes to at least partial define the side sections.

* * * * *

UNITED STATES PATENT AND TRADEMARK OFFICE
CERTIFICATE OF CORRECTION

PATENT NO. : 10,800,301 B2  
APPLICATION NO. : 16/207679  
DATED : October 13, 2020  
INVENTOR(S) : Jose Marques et al.

Page 1 of 2

It is certified that error appears in the above-identified patent and that said Letters Patent is hereby corrected as shown below:

In the Claims

Column 8, Line 4, Claim 10:  
After "linearly aligned holes to at least"  
Delete "partial" and  
Insert -- partially --.

Column 8, Lines 6-7, Claim 10:  
After "linearly aligned holes to at least"  
Delete "partial" and  
Insert -- partially --.

Column 8, Lines 8-9, Claim 10:  
After "linearly aligned holes to at least"  
Delete "partial" and  
Insert -- partially --.

Column 8, Lines 26-27, Claim 12:  
After "the central foam component to"  
Delete "defining" and  
Insert -- define --.

Column 8, Lines 28-29, Claim 12:  
After "the central foam component to"  
Delete "defining" and  
Insert -- define --.

Column 9, Line 7, Claim 20:  
After "to at least"  
Delete "partial" and

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*

Insert -- partially --.

Column 9, Line 9, Claim 20:
After "to at least"
Delete "partial" and
Insert -- partially --.

Column 9, Lines 11-12, Claim 20:
After "to at least"
Delete "partial" and
Insert -- partially --.